United States Patent
Yi et al.

(10) Patent No.: US 9,864,231 B2
(45) Date of Patent: Jan. 9, 2018

(54) BACKLIGHT UNIT AND LIQUID CRYSTAL DISPLAY DEVICE INCLUDING THE SAME

(71) Applicant: LG Display Co., Ltd., Seoul (KR)

(72) Inventors: Gihyun Yi, Anyang-si (KR); YoungDae Kim, Suwon-si (KR); Hyosub Kim, Seoul (KR); Gahui Kang, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/219,695

(22) Filed: Jul. 26, 2016

(65) Prior Publication Data

US 2017/0184917 A1   Jun. 29, 2017

(30) Foreign Application Priority Data

Dec. 24, 2015  (KR) .................. 10-2015-0186213

(51) Int. Cl.
*G02F 1/133* (2006.01)
*G02F 1/1335* (2006.01)

(52) U.S. Cl.
CPC .. *G02F 1/133603* (2013.01); *G02F 1/133608* (2013.01); *G02F 1/133605* (2013.01)

(58) Field of Classification Search
CPC ............. G02F 1/133608; G02F 1/133603
See application file for complete search history.

(56) References Cited

U.S. PATENT DOCUMENTS

| | | | | |
|---|---|---|---|---|
| 2007/0121320 A1* | 5/2007 | Arai | ............... | G02F 1/133603 362/247 |
| 2007/0279937 A1* | 12/2007 | Hsiao | ............... | G02F 1/133603 362/613 |
| 2008/0252808 A1* | 10/2008 | Chang | ............... | G02F 1/13452 349/58 |
| 2015/0055059 A1* | 2/2015 | Suzuki | ............... | G02F 1/133605 349/67 |
| 2016/0014880 A1* | 1/2016 | Lee | ............... | H05K 1/028 361/752 |
| 2016/0342028 A1* | 11/2016 | Hwang | ............... | G02F 1/133611 |

* cited by examiner

*Primary Examiner* — James Dudek
(74) *Attorney, Agent, or Firm* — Morgan, Lewis & Bockius LLP

(57) ABSTRACT

A backlight unit includes a bottom cover; a plurality of light sources on the bottom cover; a first support side at an area directly along a first edge of the bottom cover adjacent to a corner of the bottom cover; and a second support side directly adjacent to the first support side and along the first edge of the bottom cover. The first support side includes a first vertical portion, and a first inclined portion connected to a top of the first vertical portion. The second support side includes a second vertical portion, and a second inclined portion connected to a top of the second vertical portion.

14 Claims, 8 Drawing Sheets

BACKLIGHT UNIT AND LIQUID CRYSTAL DISPLAY DEVICE INCLUDING THE SAME

CROSS REFERENCE TO RELATED APPLICATIONS

This application claims the benefit of the Korean Patent Application No. 10-2015-0186213 filed on Dec. 24, 2015 which is hereby incorporated by reference for all purposes as if fully set forth herein.

BACKGROUND OF THE INVENTION

Field of the Invention

The present invention relates to a backlight unit and a liquid crystal display device including the same, and more particularly, to a direct-type backlight unit and a liquid crystal display device including the same.

Discussion of the Related Art

Portable electronic devices, such as mobile terminals and notebook computers, typically include flat panel display devices. Among the flat panel display devices, a liquid crystal display device has advantages, such as highly-developed mass-production technology, easy driving means, low power consumption, high definition resolution, and large screen size. Since the liquid crystals do not emit light, the liquid crystal display device includes a separate light source, such as a backlight unit provided with a light-emitting diode (LED), on a rear surface of a liquid crystal panel to irradiate light toward the surface of the liquid crystal panel to display an image.

Backlight units may be categorized into direct-type backlight units and edge-type backlight units. In a direct-type backlight unit, light sources are arranged below a liquid crystal panel. In an edge-type backlight unit, a light source is arranged to face a side of a light guide plate and a plurality of optical sheets are arranged between the liquid crystal display panel and the light guide plate.

Figure 1:
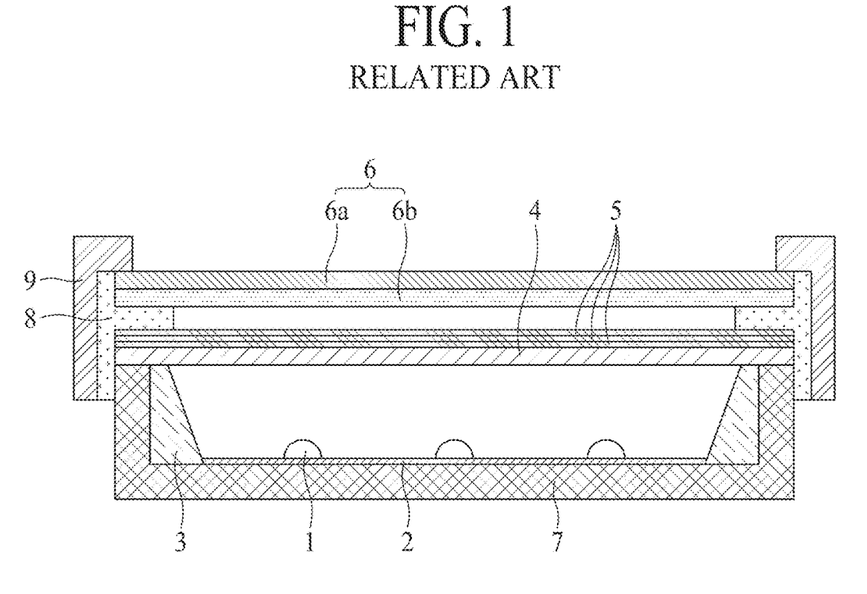
FIG. 1 is a cross-sectional view illustrating a related art liquid crystal display device that includes a direct-type backlight unit having a support side.

FIG. 1 is a cross-sectional view illustrating a related art liquid crystal display device that includes a direct-type backlight unit. The direct-type backlight unit has a structure where a plurality of optical sheets 5 and a diffuser plate 4 are disposed below a liquid crystal panel 6 and a plurality of light sources 1 are arranged below the diffuser plate 4. Light generated from the light sources 1 is scattered and refracted through the diffuser plate 4 and the optical sheets 5 and then diffused toward an entire surface of the liquid crystal panel 6. The liquid crystal display device also includes a bottom cover 7, a guide panel 8, and a case top 9 to secure the light sources 1, the diffuser plate 4, the plurality of optical sheets 5, and the liquid crystal panel 6.

Particularly, in the related art liquid crystal display device, a support side 3 having a shape inclined with respect to the bottom cover 7 is arranged at both ends of the light source 1. A path of the light generated from the light sources 1 is changed by the support side 3 to increase the light supplied to an edge area of the liquid crystal panel 6. The support side 3 may decrease a deviation between the light supplied to the edge area of the liquid crystal panel 6 as compared with the light supplied to other areas.

Figure 2:
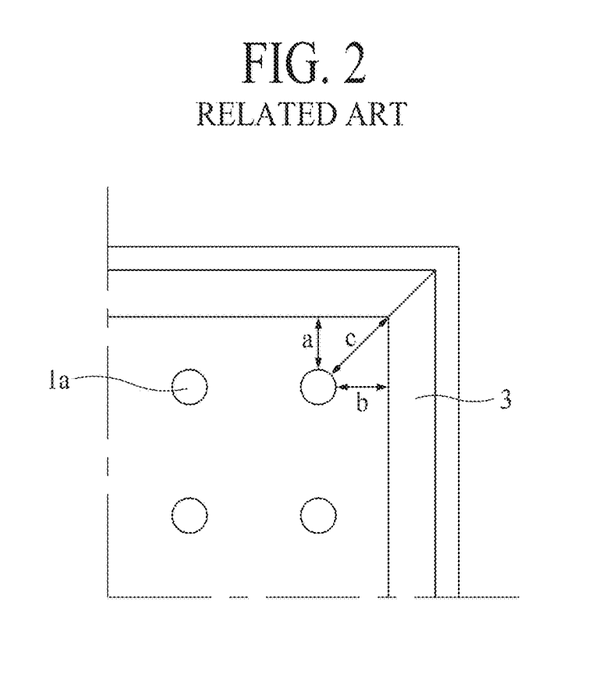
FIGS. 2 and 3 are a plane view and a perspective view illustrating an enlarged corner of a related art liquid crystal display device that includes a direct-type backlight unit having a support side.
Figure 3:
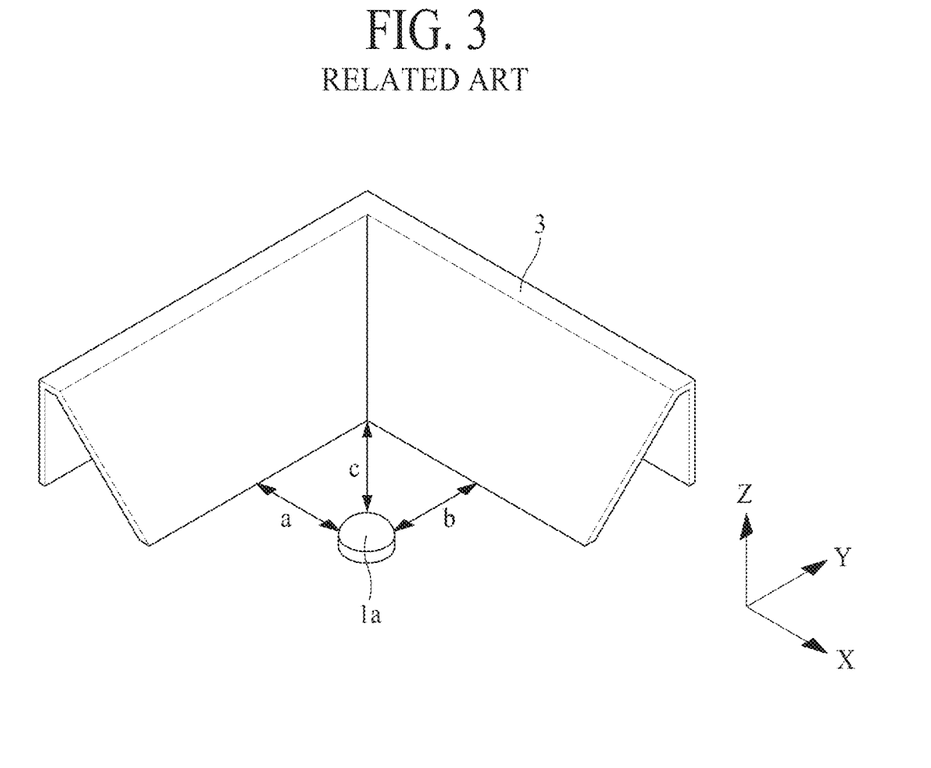

FIGS. 2 and 3 are a plane view and a perspective view illustrating an enlarged corner of a related art liquid crystal display device that includes a direct-type backlight unit having a support side 3.

The related art liquid crystal display device that includes a direct-type backlight unit as shown in FIGS. 1 to 3 has problems as follows.

As shown in FIGS. 2 and 3, if distances from a light source 1a arranged to be closest to a corner of a bottom cover 7 to the support side 3 are 'a' and 'b' respectively, and a minimum distance from the light source 1a to a corner of the support side 3 is 'c', a relation of $c > a \approx b$ is obtained, which causes a deviation between the amount of light supplied to the corner of the support side 3 as compared with other areas.

Figure 4A:
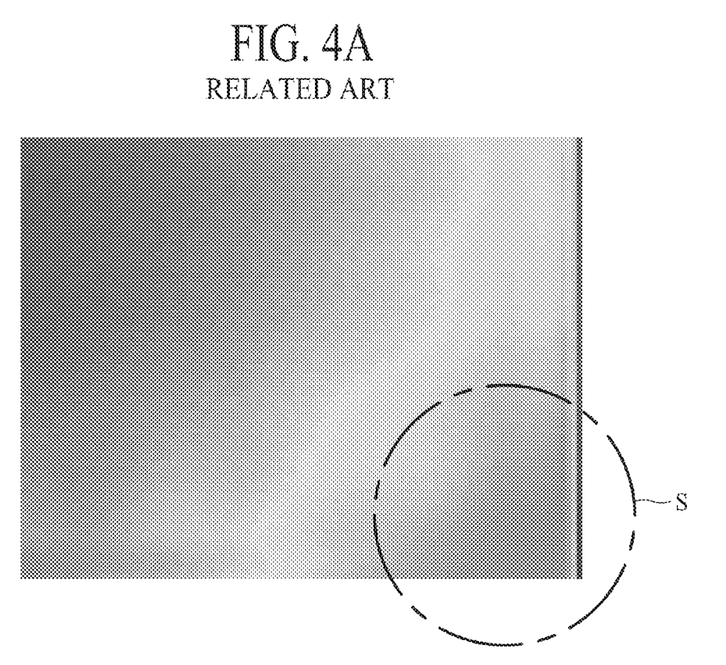
FIGS. 4A to 4C are views illustrating light supplied through a support side of the related art and an area where darkness occurs due to the light being supplied by the support side.
Figure 4B:
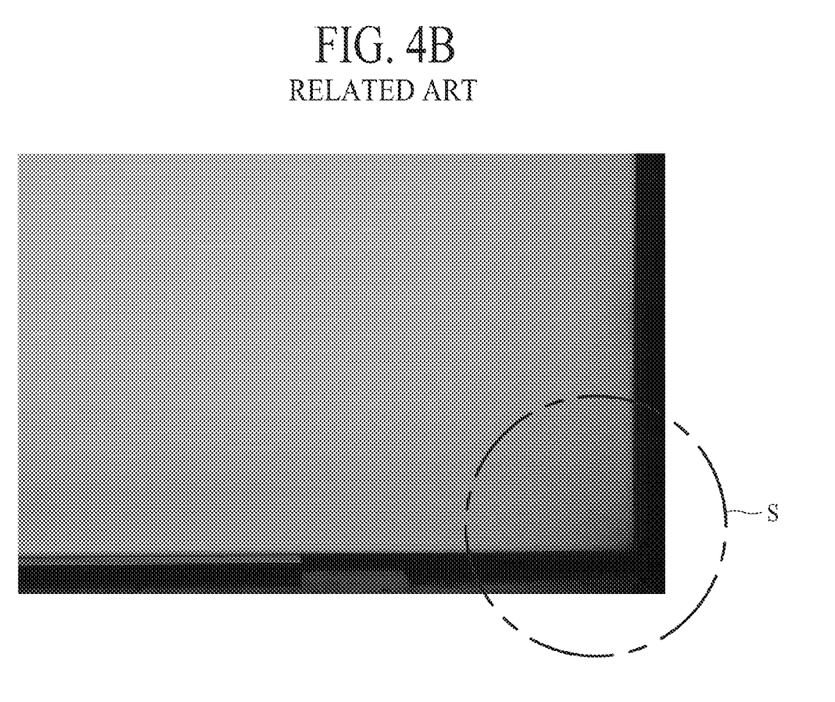
Figure 4C:
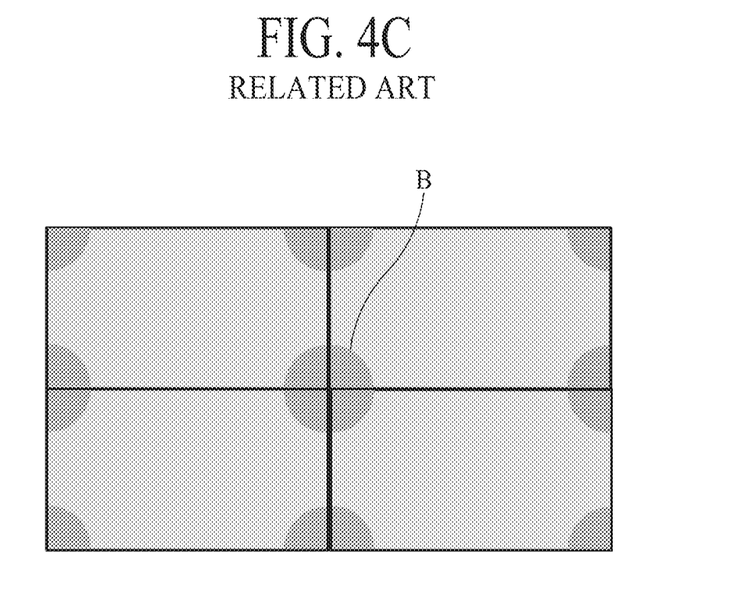

FIGS. 4A to 4C illustrate light supplied by a support side 3 of the related art, and an area where darkness occurs due to the light supplied by the support side 3.

FIG. 4A illustrates light supplied to a liquid crystal panel by a support side 3 of the related art, FIG. 4B illustrates an image displayed using the light supplied by the support side 3 of the related art, and FIG. 4C illustrates an image displayed in a videowall based on a liquid crystal display device that includes the support side 3 of the related art.

FIG. 4A illustrates that relatively more light is supplied to the liquid crystal panel 6 if a red color of an image is darker, and thus, FIG. 4A indicates that luminance is high. Relatively less light is supplied to the liquid crystal panel 6 if a green color of an image is darker, and thus, FIG. 4A indicates that luminance is low. Therefore, as shown, it is noted that less light from the light source 1 reaches an area S of FIG. 4A than a periphery area. In this state, if an image is displayed through the liquid crystal panel 6, it is noted that the area S is formed to be relatively darker than the other area as shown in FIG. 4B.

As described above, according to the related art liquid crystal display device, a problem occurs in that a dark area occurs in a corner of the liquid crystal panel due to non-uniform supply of the light.

Meanwhile, the need for a display device having an ultra-large sized area has increased in accordance with the advance of technology. However, because it is difficult to realize an ultra-large sized screen of 100 inches or more in a single display device, a technology called a videowall, multivision, or multiple unit display device based on a plurality of display devices has been developed.

The multivision display device is a display device that realizes a large sized screen by adjacently arranging a plurality of display devices in horizontal and vertical directions. In this way, the multivision display device displays different images in each unit display device or displays one image in each unit display device by dividing one image into several images.

Generally, when an image is displayed by a display device, the most important part of the image is at the center area of the overall display device, and the less important part of the image is in a corner area of the overall display area. However, if an image to be displayed is divided into unit display devices in the multivision display device, the center of the overall display area may correspond to corners of unit display devices. As a result, a dark area may occur in the corner areas of the corresponding unit display devices as described above, thereby resulting in a dark area B at the center of the image, as shown in FIG. 4C.

As described above, when an image to be displayed is divided into unit display devices of a multivision display device, a dark area may occur in important portions of the image, and a user may deem the dark area as a shortcoming in the quality of the display device.

SUMMARY

Accordingly, the present invention is directed to a backlight unit and a liquid crystal display device including the same that substantially obviate one or more of the problems due to limitations and disadvantages of the related art.

An object of the present invention is to provide a backlight unit and a liquid crystal display device including the same, in which luminance uniformity is improved over an entire area of a multivision display device comprised of liquid crystal panels by reducing light non-uniformity generated in corner areas of the liquid crystal panels.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a backlight unit comprises a bottom cover; a plurality of light sources disposed on the bottom cover; a first support side disposed at an area directly along a first edge of the bottom cover adjacent to a corner of the bottom cover; and a second support side directly adjacent to the first support side and disposed along the first edge of the bottom cover, wherein the first support side includes a first vertical portion disposed vertically with respect to a lower surface of the bottom cover, and a first inclined portion connected to a top of the first vertical portion and disposed at an incline with respect to the lower surface of the bottom cover, wherein the second support side includes a second vertical portion disposed vertically with respect to the lower surface of the bottom cover, and a second inclined portion connected to a top of the second vertical portion and disposed at an incline with respect to the lower surface of the bottom cover, and wherein surfaces of the first and second inclined portions have different orientations.

In another aspect, A liquid crystal display device, comprises a backlight unit including a bottom cover; a plurality of light sources disposed on the bottom cover; a first support side disposed at an area directly along a first edge of the bottom cover adjacent to a corner of the bottom cover; and a second support side directly adjacent to the first support side and disposed along the first edge of the bottom cover, wherein the first support side includes a first vertical portion disposed vertically with respect to a lower surface of the bottom cover, and a first inclined portion connected to a top of the first vertical portion and disposed at an incline with respect to the lower surface of the bottom cover, wherein the second support side includes a second vertical portion disposed vertically with respect to the lower surface of the bottom cover, and a second inclined portion connected to a top of the second vertical portion and disposed at an incline with respect to the lower surface of the bottom cover, and wherein surfaces of the first and second inclined portions have different orientations; and a liquid crystal panel configured to display an image using light from the backlight unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION

Advantages and features of the present invention, and implementation methods thereof will be clarified through the following embodiments described with reference to the accompanying drawings. The present invention may, however, be embodied in different forms and should not be construed as being limited to the embodiments set forth herein. Rather, these embodiments are provided so that this disclosure will be thorough and complete, and will fully convey the scope of the present invention to those skilled in the art. Further, the present invention is defined only by the scope of claims.

Any shape, size, ratio, angle, or number disclosed in the drawings for describing embodiments of the present invention is merely an example, and thus, the present invention is not limited to the illustrated details. Like reference numerals refer to like elements throughout. In the following description, when the detailed description of a relevant known element, function, or configuration is determined to unnecessarily obscure the disclosed embodiments, that item's detailed description may be omitted. Where "comprise," "have," and "include" are used in the present specification, one or more additional parts may be included unless "only" is used. A term described in the singular form also refers to the term's plural form absent indications to the contrary.

Elements should be construed as including an error range or tolerance even if there is no explicit mention of such an error range or tolerance.

In the description of embodiments, when a structure (e.g., an electrode, a line, a wire, a layer, a contact) is described as being formed on an upper portion or lower portion of another structure, on the other structure, or under the other structure, the description should be construed as describing both a case where the structures directly contact each other and a case where a third structure is disposed therebetween.

In describing a temporal relationship using temporal descriptors such as "after," "subsequent," "next," or "before," the description refers to a case with an adjacent temporal order or a non-adjacent temporal order unless "just" or "direct" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element without departing from the scope of the present invention.

Features of various embodiments may be partially or overall coupled to or combined with each other, and may be variously inter-operated with each other and driven technically as those skilled in the art can understand. The disclosed embodiments may be implemented independently from each other, or may be implemented together in a co-dependent relationship.

Hereinafter, embodiments will be described in detail with reference to the accompanying drawings.

Figure 5:
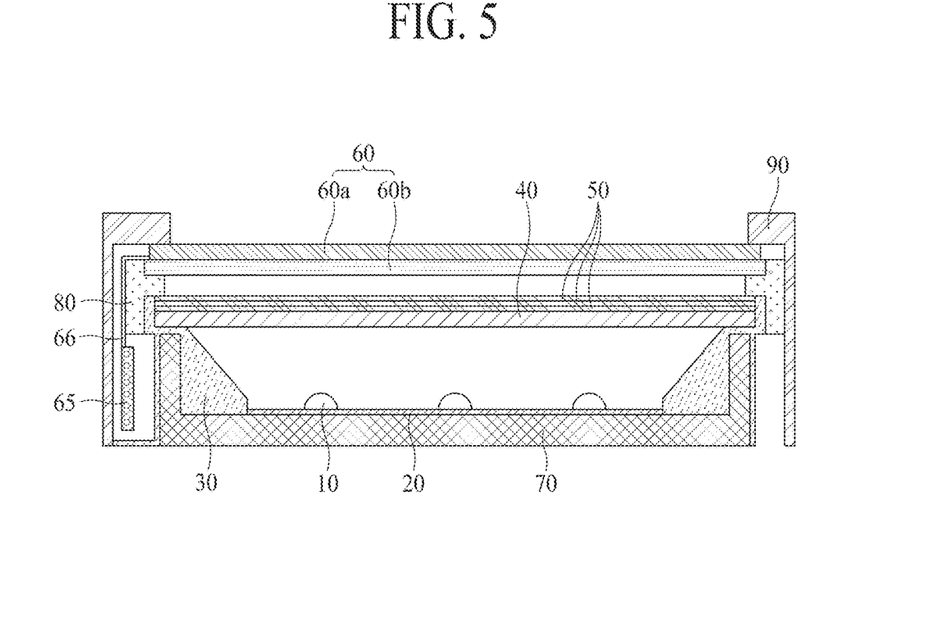
FIG. 5 is a cross-sectional view illustrating a liquid crystal display device according to an example embodiment of the present invention.

FIG. 5 is a cross-sectional view illustrating a liquid crystal display device according to an example embodiment of the present invention.

As shown in FIG. 5, a backlight unit includes a plurality of light sources 10 disposed in a bottom cover 70 to provide light toward a liquid crystal panel 60, a reflector 20 disposed in the bottom cover 70 to reflect light from the light sources 10 toward the liquid crystal panel 60, and a diffuser plate 40 and a plurality of optical sheets 50 to diffuse the light provided from the light sources 10 toward an entire surface of the liquid crystal panel 60 by scattering and refracting the light. The backlight unit includes a support side 30. The support side 30 changes a path of the light provided from the light sources 10 toward the liquid crystal panel 60 on the bottom cover 70 and supports the diffuser plate 40 and the plurality of optical sheets 50. The backlight unit includes a guide panel 80 supporting the liquid crystal panel 60 on the support side 30.

In more detail, the support side 30 is disposed on an outer surface of the bottom cover 70, which includes a lower surface and a side formed to be extended by being upwardly bent at a corner of the lower surface. That is, the support side 30 is disposed on a corner to increase the amount of light provided to the corner of the liquid crystal panel 60, thus, a deviation of the light provided to the corner and the other area of the liquid crystal panel 60 is reduced.

A printed circuit board 65 is connected along at least one corner of the liquid crystal panel 60 using a connection member 66, such as a flexible printed circuit board (FPCB) or tape carrier package (TCP).

Also, a case top 90 may be provided to have a rectangular frame shape to cover the upper surface and the side of the liquid crystal panel 60. An image realized by the liquid crystal panel 60 may be displayed through an opening of the case top 90.

Although the example of FIG. 5 illustrates the support side 30 and the guide panel 80 as separate elements, the support side 30 and the guide panel 80 may be disposed as a single body. That is, in another embodiment, the support side 30 for supporting the diffuser plate 40 and the optical sheets 50, and the guide panel 80 for supporting the liquid crystal panel 60 may be disposed separately from each other, and one element provided in a single body may support all of the diffuser plate 40, the optical sheets 50 and the liquid crystal panel 60. In this case, the single body may be named as a support side or guide panel, or may be named as a new element.

The support side 30 of the backlight unit according to one embodiment includes a first support side 31 disposed in a predetermined area on the corner of the bottom cover 70 and a second support side 32 disposed in an area other than the predetermined area while being connected with the first support side 31. The first support side 31 and the second support side 32 are disposed in their respective shapes that are different from each other. By contrast, in a related art device, although a light path is changed by the support side having a uniform shape, the light in the related art is provided relatively less to the corner of the liquid crystal panel in accordance with the arrangement of the light sources. However, the support side 30 according to one embodiment uniformly provides light to the entire surface including the corner of the liquid crystal panel 60 having the first support side 31 and the second support side 32 with different respective shapes.

Hereinafter, the structure of the support side 30 according to an example embodiment will be described in more detail. Particularly, for convenience of description, the support side 30 according to one example embodiment will be described. Various modifications and corrections may be made in elements within the range that does not depart from the technical spirit of disclosed embodiments.

Figure 6:
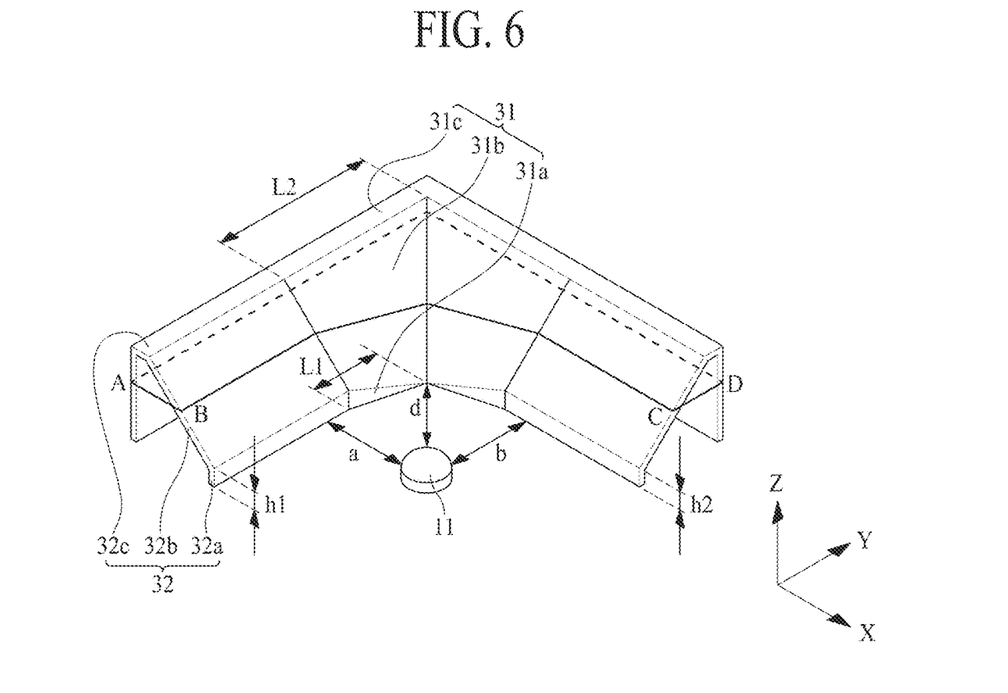
FIG. 6 is a perspective view illustrating a backlight unit that includes a support side according to the example embodiment.

FIG. 6 is a perspective view illustrating a backlight unit that includes a support side according to an example embodiment.

As shown in FIG. 6, the first support side 31 includes a vertical portion 31a, an inclined portion 31b, and a horizontal portion 31c. The vertical portion 31a is disposed vertically with respect to the lower surface of the bottom cover 70. The inclined portion 31b has one end connected with the other end of the vertical portion 31a, and is disposed to be inclined at a predetermined angle with respect to the lower surface of the bottom cover 70. The horizontal portion 31c has one end connected with the other end of the inclined portion 31b, and is provided in parallel with the lower surface of the bottom cover 70.

The second support side 32 includes a vertical portion 32a, an inclined portion 32b, and a horizontal portion 32c. The vertical portion 32a is provided vertically with respect to the lower surface of the bottom cover 70. The inclined portion 32b has one end connected with the other end of the vertical portion 32a, and is provided to be inclined at a predetermined angle with respect to the lower surface of the bottom cover 70. The horizontal portion 32c has one end connected with the other end of the inclined portion 32b, and is provided in parallel with the lower surface of the bottom cover 70.

By comparison, as shown in FIGS. 1 to 3, if the support side does not include the vertical portion (that is, if an inclined element of the support side is disposed to directly adjoin the bottom cover), light may not be uniformly diffused on the liquid crystal panel. Specifically, according to the related art, the area where the inclined element of the support side adjoins the bottom cover corresponds to the area closest to the light sources, and a light path is changed from the corresponding area as the corresponding area starts to be inclined. Accordingly, the brightest light is concentrated on the liquid crystal panel corresponding to an upper portion of the corresponding area. For this reason, a problem occurs in that a relatively bright area is formed in the area where the support side adjoins the bottom cover.

Therefore, the example embodiment solves the problem of light being excessively concentrated on the position closest to the light sources. Specifically, the support side 30 is disposed with the vertical portions 31a and 32a to solve the problem that the area where support side 30 adjoins the bottom cover 70 is bright.

Also, since the support side 30 changes the light path to provide the light to the corner area of the liquid crystal panel 60, the support side 30 includes the inclined portions 31b and 32b as well as the vertical portions 31a and 32a, wherein the inclined portions 31b and 32b are disposed to be inclined on the other ends of the vertical portions 31a and 32a to provide the light of the light sources 10 toward the liquid crystal panel 60.

Also, since the support side 30 should support the diffuser plate 40 and the optical sheets 50, the support side 30 includes the horizontal portions 31c and 32c. The horizontal portions 31c and 32c are disposed on the other ends of the inclined portions 31b and 32b to support the diffuser plate 40 and the optical sheets 50 on the diffuser plate 40 while directly adjoining the diffuser plate 40.

In more detail, the predetermined angle of the inclined portions 31b and 32b with respect to the lower surface of the bottom cover 70 may be set by reflecting a light orientation angle of the light sources 10 and a distance between the light sources 10 and the support side 30. The light orientation angle means a diffused angle of light provided from the light sources 10. The light orientation angle may be represented based on the lower surface of the bottom cover 70 or a vector vertical to the lower surface of the bottom cover 70.

Particularly, the support side 30 according to one embodiment includes a first support side 31 disposed in a predetermined area on the corner of the bottom cover 70 and a second support side 32 disposed in an area other than the predetermined area while being connected with the first support side 31. The first support side 31 and the second support side 32 are disposed with their respective shapes different from each other.

That is, according to the example embodiment, because the first support side 31 disposed on the corner of the bottom cover 70 and the second support side 32 disposed in the other area are disposed in their respective shapes different from each other, the light may be uniformly provided to the entire surface of the liquid crystal panel 60 to overcome darkness in the corner of the liquid crystal panel 60.

In more detail, with reference to FIG. 6, if a first light source 11 is the light source which is disposed to be closest to the corner of the bottom cover 70 among the light sources 10, a minimum distance from the first light source 11 to the support side 30 disposed on a first edge of the bottom cover 70 is 'a', a minimum distance from the first light source 11 to the support side 30 disposed on a second edge of the bottom cover 70 is 'b', and a minimum distance from the first light source 11 to a corner where the support sides disposed in the first edge and the second edge of the bottom cover 70 adjoin each other is 'd', values of 'a' and 'b' are about the same as each other, and has a value greater than 'a' and 'b'.

As described above, as the light sources 10 are arranged on the bottom cover 70 having a rectangular shape, the light sources 10 have no choice but to be spaced apart from the corner at the maximum distance, and the least light is provided to the corner, thus, darkness may occur in the corner of the liquid crystal panel 60.

To solve the problem, the first support side 31 and the second support side 32 may be disposed in their respective shapes different from each other to increase the amount of light provided on the corner of the bottom cover 70.

In more detail, the vertical portion 31a of the first support side 31 may have a height lower than that of the vertical portion 32a of the second support side 32. That is, if the height of the vertical portions 31a and 32a disposed closer to the light sources 10 is low, the amount of the light provided toward the liquid crystal panel 60 may be increased. Therefore, in one embodiment, the height of the vertical portion 31a of the first support side 31 is disposed to be lower than that of the vertical portion 32a of the second support side 32 to increase the light provided toward the corner of the liquid crystal panel 60. The height of the vertical portions 31a and 32a may be calculated as an average value of heights in all areas of the support sides 31 and 32.

Particularly, the vertical portion 31a of the first support side 31 may be disposed such that its height may be linearly reduced from one side connected with the vertical portion 32a of the second support side 32 to the other side which is not connected with the vertical portion 32a of the second support side 32.

That is, since the first support side 31 is disposed in a predetermined area on the corner of the bottom cover 70, the amount of light provided from the light sources 10 is reduced toward the corner of the bottom cover 70. Therefore, the height of the vertical portion 31a of the first support side 31 may be disposed to be linearly reduced toward the area corresponding to the corner of the bottom cover 70, and thus, the light provided to the corner of the liquid crystal panel 60 may be maintained uniformly according to the reflecting amount of the provided light. Since the height of the vertical portion 31a of the first support side 31 may be disposed to be linearly varied, a difference of the light path at a boundary between the first support side 31 and the second support side 32 and within the first support side 31 may be solved.

On the other hand, the vertical portion 32a of the second support side 32 is disposed at a uniform height. That is, since the second support side 32 is disposed on the edge of the bottom cover 70, the light from the light sources 10 arranged at constant intervals may uniformly be provided to the second support side 32, whereby the vertical portion 32a is sufficiently provided at a uniform height.

Particularly, the height of the vertical portion 31a of the first support side 31 is linearly reduced to reach a value of 0 in the area corresponding to the corner of the bottom cover 70, so as to increase the amount of light provided from the corner to the liquid crystal panel 60 to a maximum range.

A length or area of the predetermined are where the first support side 31 is disposed in the entire area of the support side 30 may be determined in accordance with a deviation of the light provided to the edge and corner of the bottom cover 70.

In more detail, the length or area of the predetermined area where the first support side 31 is disposed may be varied by reflecting the distance between the light sources 10 and the support side 30. That is, if the distance between the light sources 10 and the support side 30 is increased, the amount of light provided to the support side 30 is reduced. This reduced amount of light greatly affects light provided at the corner of the first support side 31 arranged to be farthest away from the light sources 10. Therefore, if the distance between the light sources 10 and the support side 30 is increased, the length or area of the predetermined area where the first support side 31 is disposed may be increased, and if the distance between the light sources 10 and the support side 30 is reduced, the length or area of the predetermined area where the first support side 31 is disposed may be reduced.

Particularly, the length or area of the predetermined area where the first support side 31 is disposed may be controlled in various manners. Specifically, according to one embodiment, the inclined portion 31b of the first support side 31 adjoins each of the vertical portion 31a and the horizontal portion 31c. Therefore, a length of a tangent line where the inclined portion 31b adjoins the vertical portion 31a or the horizontal portion 31c can be controlled to increase or reduce the length or area of the predetermined area where the first support side 31 is provided.

In more detail, a length L1 of the tangent line where the inclined portion 31b adjoins the vertical portion 31a may be increased or a length L2 of the tangent line where the inclined portion 31b adjoins the horizontal portion 31c may be increased, so as to increase the length or area of the predetermined area. The length L1 of the tangent line where the inclined portion 31b adjoins the vertical portion 31a may be reduced, or the length L2 of the tangent line where the inclined portion 31b adjoins the horizontal portion 31c may be reduced, so as to reduce the length or area of the predetermined area.

However, the present invention is not limited to the above examples, and thus, the predetermined area where the first support side 31 is disposed may be determined by reflecting various factors as desired.

In FIG. 6, the height of the vertical portion 32a of the second support side 32 disposed on the first edge of the bottom cover 70 is represented as h1, and the height of the vertical portion 32a of the second support side 32 disposed on the second edge of the bottom cover 70 is represented as h2. Although h1 and h2 may be disposed to have the same value, since the present invention is not limited to this example, h1 and h2 may be set to have different heights by reflecting the distance with the light sources 10.

Also, in one embodiment, the maximum distance d from the first light source 11 of the plurality of light sources 10 to the first support side 31 may be disposed to satisfy the following Equation 1.

$$d < \sqrt{a^2 + b^2} \quad \text{[Equation 1]}$$

In this case, 'a' indicates a minimum distance from the first light source 11 to the support side on the first edge of the bottom cover 70, and 'b' indicates a minimum distance from the first light source 11 to the support side provided on the second edge of the bottom cover 70.

In the related art liquid crystal display device shown in FIG. 3, a distance 'c' from the light source disposed to be closest to the corner of the bottom cover to the support side is provided to satisfy the following Equation 2 in accordance with Pythagoras' Theorem.

$$c = \sqrt{a^2 + b^2} \quad \text{[Equation 2]}$$

Unlike the related art, the corner area of the first support side 31 is disposed at an inner side of the bottom cover 70 to reduce the distance between the first support side 31 and the first light source 11. Therefore, the amount of light provided to the corner of the liquid crystal panel 60 may be increased.

Hereinafter, a detailed structure of the support side 30 according to one embodiment, which is intended to reduce the distance between the first light source 11 and the first support side 31, will be described.

Figure 7A:
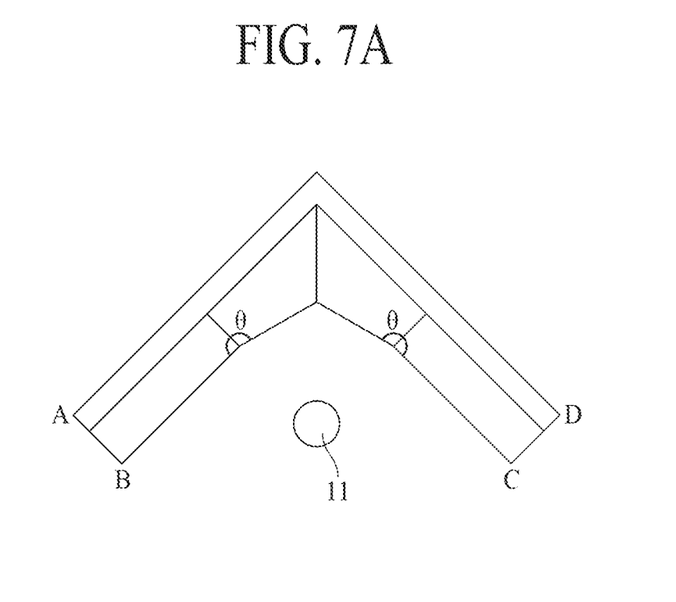
FIGS. 7A and 7B are cross-sectional views illustrating a backlight unit according to the example embodiment taken along a plane of "A-B-C-D" of FIG. 6.
Figure 7B:
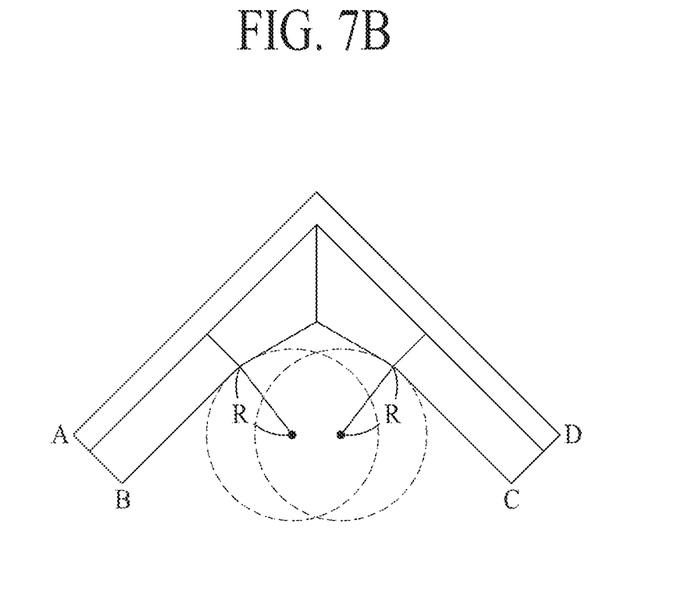

FIGS. 7A and 7B are cross-sectional views illustrating a backlight unit according to one embodiment, which is taken along a plane of "A-B-C-D" of FIG. 6.

As show in FIGS. 7A and 7B, if the support side 30 is taken along a plane of "A-B-C-D" parallel with X-Y plane, since the first support side 31 and the second support side 32 are disposed in their respective shapes different from each other, it is noted that the sectional view is not represented as a shape simply obtained by rotation of "]".

In more detail, the first support side 31 and the second support side 32 according to the first embodiment are disposed to be connected with each other at an interface in a bent shape toward an inner side of the bottom cover 70 to have a predetermined angle θ. That is, as described above, the maximum distance between the first support side 31 disposed on the corner of the bottom cover 70 and the light sources 10 is reduced to increase the amount of light provided to the corner of the liquid crystal panel 60. To this end, the first support side 31 may be disposed in a bent shape toward the inner side of the bottom cover 70 as shown in FIG. 7A to have a predetermined slope with the second support side 32.

The predetermined angle θ is preferably formed in the range that it is greater than 180° and smaller than 190° but the present invention is not limited to this range.

Also, since it is not required that the first support side 31 and the second support side 32 should be disposed in a bent shape, a boundary area of the inclined portion 31b of the first support side 31 and the inclined portion 32b of the second support side 32 may be disposed to have a predetermined curvature as shown in FIG. 7B in accordance with the second embodiment. That is, the first support side 31 and the second support side 32 may be disposed to have a certain radius R and a predetermined curvature based on the radius R, and thus, the first support side 31 and the second support side 32 may be connected with each other without any difference at the boundary area.

In the second embodiment, a difference of light provided by the first support side 31 and the second support side 32 may be reduced as compared with the first embodiment.

Also, an angle of the inclined portion 31b of the first support side 31 with respect to the lower surface of the bottom cover 70 is greater than an angle of the inclined portion 32b of the second support side 32 with respect to the lower surface of the bottom cover 70.

That is, as described above, in one embodiment, since the vertical portion 31a of the first support side 31 is disposed to have a lower height than that of the vertical portion 32a of the second support side 32, the inclined portion 31b of the first support side 31 connected with the vertical portion 31a having the lower height is disposed to have a greater angle with the lower surface of the bottom cover 70 than the inclined portion 32b of the second support side 32 connected with the vertical portion 32a having the higher height.

In this way, the support side is not disposed in a uniform shape in the entire area on the bottom cover, and the first support side 31 disposed in the predetermined area on the corner of the bottom cover and the second support side 32 in the other area are disposed in their respective shapes that are different from each other, and therefore, uniform light may be provided to the entire area of the liquid crystal panel 60.

Also, a separate reflector or a reflector with perforation may additionally be disposed above the support side 30 according to another embodiment. That is, a reflector made of a material with high reflectivity may be included in the upper portion of the support side 30 to reflect light provided from the light sources 10 at high efficiency, and thus, the amount of light provided to the liquid crystal panel 60 may be increased.

Figure 8A:
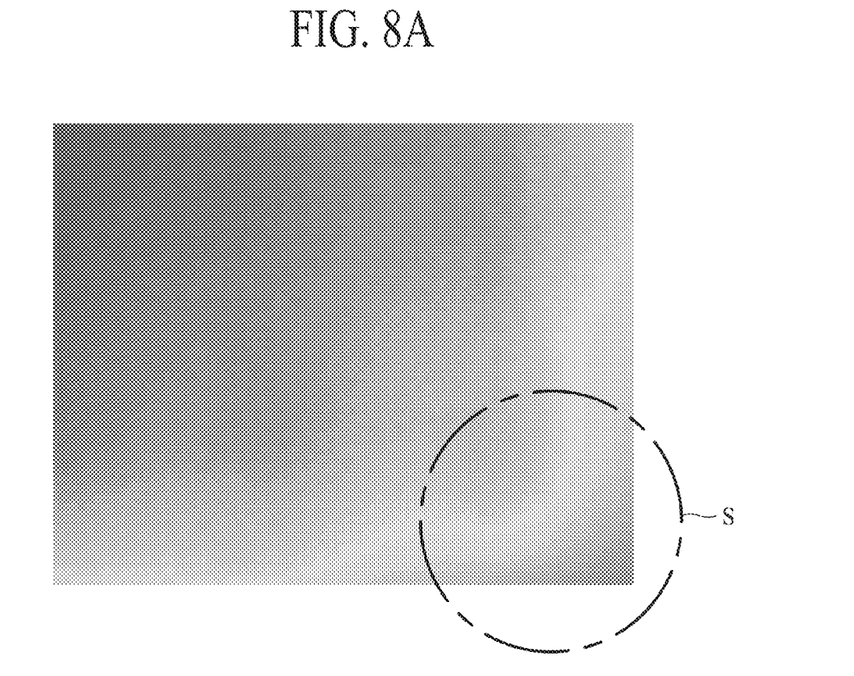
FIGS. 8A and 8B are views illustrating light supplied by a support side according to the example embodiment and an image of a liquid crystal panel according to the light supplied by the support side.
Figure 8B:
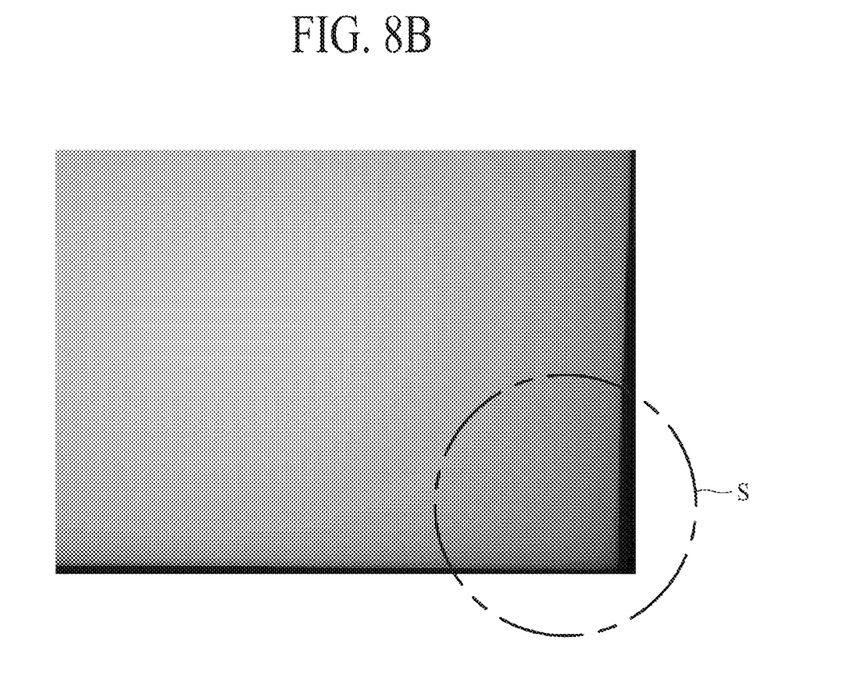

FIGS. 8A and 8B are views illustrating light supplied by a support side according to an example embodiment of the present invention and an image of a liquid crystal panel according to the light supplied by the support side.

FIG. 8A illustrates light provided to the liquid crystal panel by the support side according to an example embodiment of the present invention, and FIG. 8B illustrates an image displayed using the light provided by the support side according to one embodiment.

As shown in FIG. 8A, uniform light is provided to the liquid crystal panel 60 by the support side 30 disposed in the structure according to one embodiment, and as shown in FIG. 8B, it is noted that a dark area where visibility is reduced is not formed in the displayed image as the uniform light is provided to the liquid crystal panel 60.

That is, there is only little light deviation between an area S of FIG. 8A and the other area according to this example embodiment as compared with the area S of FIG. 4A. For this reason, as shown in FIG. 8B, a dark area in the image displayed through the liquid crystal panel is substantially avoided.

Figure 9:
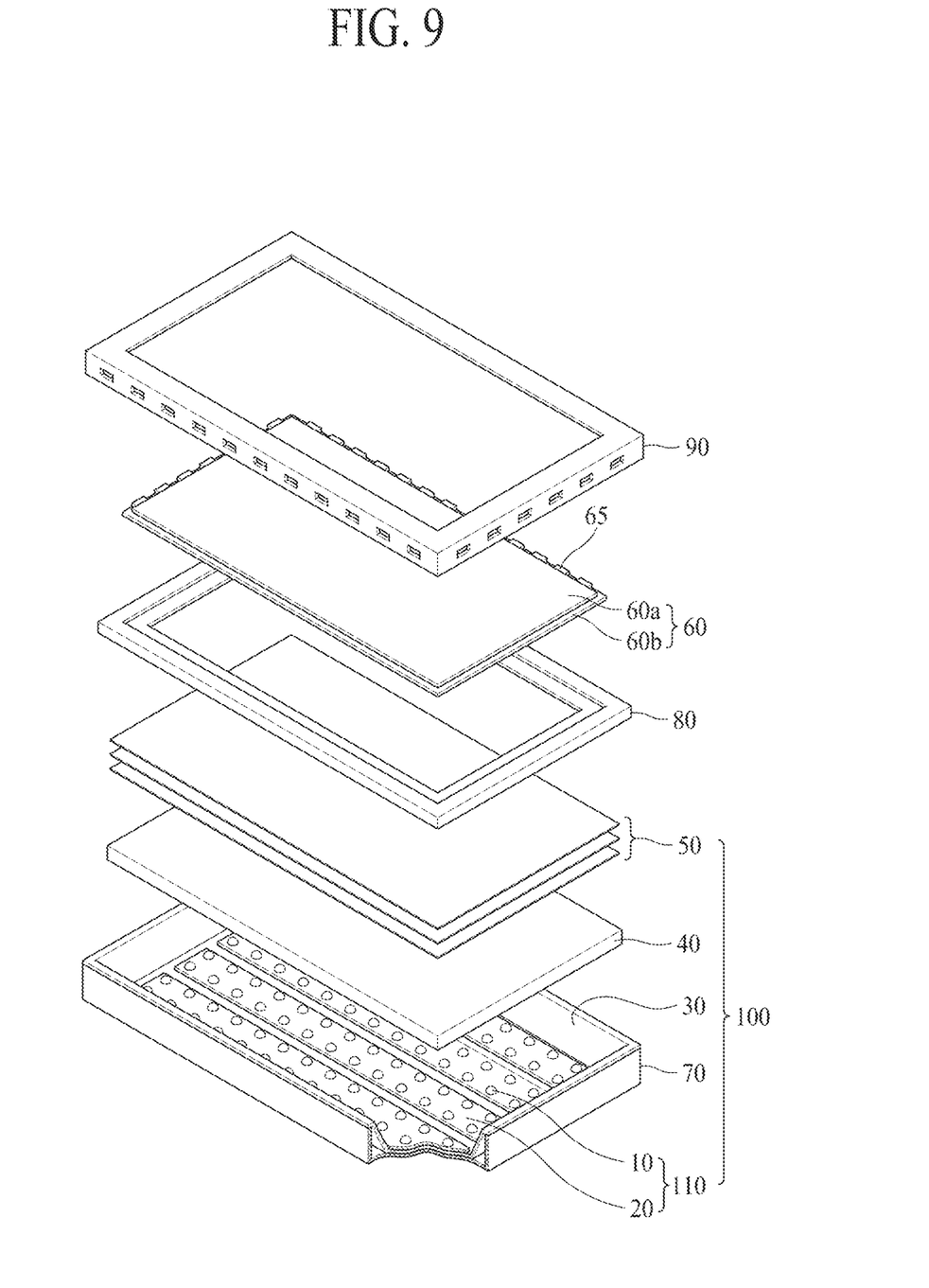
FIG. 9 is an exploded view illustrating a liquid crystal display device that includes a backlight unit according to an example embodiment of the present invention.

FIG. 9 is an exploded view illustrating a liquid crystal display device that includes a backlight unit according to an example embodiment.

As shown in FIG. 9, the liquid crystal display device includes a liquid crystal panel 60, a backlight unit 100, a guide panel 80, a bottom cover 70, and a case top 90.

The liquid crystal panel 60 displays an image, and includes an upper substrate 60a and a lower substrate 60b bonded to each other to face each other with a liquid crystal layer interposed therebetween.

Although not shown in FIG. 9, a plurality of gate lines cross a plurality of data lines inside the lower substrate 60b to define pixels, and a thin film transistor (TFT) is disposed at each crossing point of the gate lines and the data lines corresponding to a transparent pixel electrode formed in each pixel.

Color filters having colors such as red (R), green (G) or blue (B) corresponding to each pixel and a black matrix are disposed inside the upper substrate 60a. The black matrix surrounds each of the color filters of red (R), green (G) and blue (B) and covers non-display elements such as the gate lines, the data lines and the thin film transistors. Also, a transparent common electrode covering the color filters and the black matrix is disposed.

However, since the disclosed embodiments are not limited to the above example, the color filters may be disposed on a TFT of the lower substrate 60b, such as in a Color filter On TFT (COT) type liquid crystal panel 60 without being formed in the upper substrate 60a.

A printed circuit board 65 is connected along at least one corner of the liquid crystal panel 60 using a connection member 66, such as a flexible printed circuit board (FPCB) or tape carrier package (TCP).

The printed circuit board 65 may include a gate driving circuit scanning and delivering on/off signal of the thin film transistor to the gate lines and a data driving circuit delivering an image signal per frame to the data lines. The gate driving circuit and the data driving circuit may be disposed at two adjacent corners of the liquid crystal panel 60.

In the liquid crystal panel 60 of the aforementioned structure, if the thin film transistor selected for each gate line is turned on by the scanned and delivered on/off signal of the gate driving circuit, a signal voltage of the data driving circuit is delivered to the corresponding pixel electrode through the data line. For this reason, an alignment direction of liquid crystal molecules is varied by an electric field between the pixel electrode and the common electrode, whereby a difference in transmittance is generated.

Also, the liquid crystal display device according to some embodiments includes a backlight unit 100 that provides light on a rear surface of the liquid crystal panel 60 to externally generate a difference in transmittance represented by the liquid crystal panel 60. The backlight unit 100 includes a light source package 110, a diffuser plate 40 and a plurality of optical sheets 50, wherein the diffuser plate 40 and the optical sheets 50 are disposed above the light source package 110.

The light source package 110 includes printed circuit boards (PCBs; not shown) constantly spaced in areas along an inner side in a length direction of the bottom cover 70, and a reflector 20 and a plurality of light sources 10, which are packaged in each of the PCBs. Metal core PCBs with radiating functions may be used as the PCBs. A radiator may be disposed on a rear surface of the metal core PCB to externally emit heat delivered from each light source 10.

The plurality of optical sheets 50 may include various functional sheets, such as reflective polarizing film called dual brightness enhancement film (DBEF) or prism. Therefore, the light provided from the plurality of light sources 10 enters the liquid crystal panel 60 after sequentially passing through the diffuser plate 40 and the optical sheets 50, and the liquid crystal panel 60 may display an image of high luminance by using the light.

The liquid crystal panel 60 and the backlight unit 100 may be contained within a case top 90, a support main 140 and the bottom cover 70. The case top 90 has a section of a rectangular frame bent at a right angle to cover an upper surface and a side edge of the liquid crystal panel 60, and its entire surface is opened to display an image on the liquid crystal panel 60. Also, the bottom cover 70 serves as a bottom case for receiving the backlight unit 100. To this end, each edge of the bottom cover 70 is elevated at a slanted angle, and the support side 30 is disposed on the bottom cover 70 to form a predetermined space therein.

Particularly, as described above, in this example embodiment, the support side 30 includes the first support side 31 provided in the predetermined area on the corner of the bottom cover 70 and the second support side 32 provided in the other area except the predetermined area, and the first support side 31 and the second support side 32 are provided in their respective shapes different from each other to provide uniform light to the liquid crystal panel 60 and to prevent darkness in a corner area of the liquid crystal panel 60. Also, the rectangular frame shaped guide panel 80 that is placed on the bottom cover 70, and that surrounds the corners of the liquid crystal panel 60 and the backlight unit 100, is coupled to the case top 90 and the bottom cover 70.

Moreover, although not shown, a multiple unit display device may be disposed by arranging a plurality of liquid crystal display devices in horizontal and vertical directions, wherein each of the plurality of liquid crystal display devices includes a backlight unit provided with a plurality of support side members respectively disposed in different positions of the bottom cover 70 to change the path of the light in different directions.

In the embodiments described as above, the following example advantages may be obtained.

A darkness generated in the corner area of the liquid crystal panel may be removed, and thus, an image having uniform luminance may be provided. Also, if the liquid crystal display device that includes a backlight unit according to the present invention is applied to a multivision display device disposed by arranging a plurality of liquid crystal display devices, an image having improved luminance uniformity may be provided through all the liquid crystal display devices, where the backlight units reduce darkness around the edges of the center image.

It will be apparent to those skilled in the art that various modifications and variations can be made in the backlight unit and the liquid crystal display device including the same of the present invention without departing from the spirit or scope of the invention. Thus, it is intended that the present invention cover the modifications and variations of this invention provided they come within the scope of the appended claims and their equivalents.

What is claimed is:

1. A backlight unit, comprising:
a bottom cover;
a plurality of light sources disposed on the bottom cover;
a first support side disposed at an area directly along a first edge of the bottom cover adjacent to a corner of the bottom cover; and
a second support side directly adjacent to the first support side and disposed along the first edge of the bottom cover,
wherein the first support side includes a first vertical portion disposed vertically with respect to a lower surface of the bottom cover, and a first inclined portion connected to a top of the first vertical portion and disposed at an incline with respect to the lower surface of the bottom cover,
wherein the second support side includes a second vertical portion disposed vertically with respect to the lower surface of the bottom cover, and a second inclined portion connected to a top of the second vertical portion and disposed at an incline with respect to the lower surface of the bottom cover,
wherein surfaces of the first and second inclined portions have different orientations, and
wherein the first vertical portion of the first support side has an average height lower than an average height of the second vertical portion of the second support side.

2. The backlight unit of claim 1, wherein the first vertical portion of the first support side has a height that decreases from an end connected with the second vertical portion of the second support side to another end of the first vertical portion corresponding to the corner of the bottom cover, and
wherein the second vertical portion of the second support side has a uniform height.

3. The backlight unit of claim 2, wherein the first vertical portion of the first support side has a height of 0 at the end corresponding to the corner of the bottom cover.

4. The backlight unit of claim 1, wherein the first inclined portion of the first support side abuts the second inclined portion of the second support side to define an interface edge.

5. The backlight unit of claim 4, wherein an angle between the interface and the top of the first vertical portion is greater than 180° and less than 190°.

6. The backlight unit of claim 1, wherein a boundary area of the inclined portion of the first support side and the inclined portion of the second support side is disposed to have a predetermined curvature.

7. The backlight unit of claim 1, wherein a second edge of the bottom cover at the corner has first and second support sides provided therealong,
wherein a maximum distance 'd' from a first light source, which is closest to the corner of the bottom cover among the plurality of light sources, to the first support side is provided to satisfy $d < \sqrt{a^2+b^2}$, where 'a' indicates a minimum distance from the first light source to the second support side disposed on the first edge of the bottom cover, and 'b' indicates a minimum distance from the first light source to the second support side disposed on the second edge of the bottom cover.

8. A liquid crystal display device, comprising:
a backlight unit including:
a bottom cover;
a plurality of light sources disposed on the bottom cover;
a first support side disposed at an area directly along a first edge of the bottom cover adjacent to a corner of the bottom cover; and
a second support side directly adjacent to the first support side and disposed along the first edge of the bottom cover,
wherein the first support side includes a first vertical portion disposed vertically with respect to a lower surface of the bottom cover, and a first inclined portion connected to a top of the first vertical portion and disposed at an incline with respect to the lower surface of the bottom cover,
wherein the second support side includes a second vertical portion disposed vertically with respect to the lower surface of the bottom cover, and a second inclined portion connected to a top of the second vertical portion and disposed at an incline with respect to the lower surface of the bottom cover,
wherein surfaces of the first and second inclined portions have different orientations,
wherein the first vertical portion of the first support side has an average height lower than an average height of the second vertical portion of the second support side; and
a liquid crystal panel configured to display an image using light from the backlight unit.

9. The liquid crystal display device of claim 8, wherein the first vertical portion of the first support side has a height that decreases from an end connected with the second vertical portion of the second support side to another end of the first vertical portion corresponding to the corner of the bottom cover, and
wherein the second vertical portion of the second support side has a uniform height.

10. The liquid crystal display device of claim 9, wherein the first vertical portion of the first support side has a height of 0 at the end corresponding to the corner of the bottom cover.

11. The liquid crystal display device of claim 8, wherein the first inclined portion of the first support side abuts the second inclined portion of the second support side to define an interface edge.

12. The liquid crystal display device of claim 11, wherein an angle between the interface and the top of the first vertical portion is greater than 180° and less than 190°.

13. The liquid crystal display device of claim 8, wherein a boundary area of the inclined portion of the first support side and the inclined portion of the second support side is disposed to have a predetermined curvature.

14. The liquid crystal display device of claim 8, wherein a second edge of the bottom cover at the corner has first and second support sides provided therealong, wherein a maximum distance 'd' from a first light source, which is closest to the corner of the bottom cover among the plurality of light sources, to the first support side is provided to satisfy $d<\sqrt{a^2+b^2}$, where 'a' indicates a minimum distance from the first light source to the second support side disposed on the first edge of the bottom cover, and 'b' indicates a minimum distance from the first light source to the second support side disposed on the second edge of the bottom cover.

* * * * *